(12) United States Patent
Zhang et al.

(10) Patent No.: US 12,455,414 B2
(45) Date of Patent: Oct. 28, 2025

(54) VARIABLE DUAL-DIRECTIONAL THERMAL COMPENSATOR FOR ARRAYED WAVEGUIDE GRATING (AWG) MODULES

(71) Applicant: Molex, LLC, Lisle, IL (US)

(72) Inventors: Shuyu Zhang, Fremont, CA (US); Glenn Lee, Fremont, CA (US); Taizhong Huang, Zhuhai (CN); Senming Gong, Zhuhai (CN); Mike C. Huang, San Jose, CA (US)

(73) Assignee: Molex, LLC, Lisle, IL (US)

( * ) Notice: Subject to any disclaimer, the term of this patent is extended or adjusted under 35 U.S.C. 154(b) by 313 days.

(21) Appl. No.: 18/016,501

(22) PCT Filed: Jul. 31, 2021

(86) PCT No.: PCT/IB2021/056906
§ 371 (c)(1),
(2) Date: Jan. 17, 2023

(87) PCT Pub. No.: WO2022/024022
PCT Pub. Date: Feb. 3, 2022

(65) Prior Publication Data
US 2023/0305227 A1 Sep. 28, 2023

Related U.S. Application Data

(60) Provisional application No. 63/059,204, filed on Jul. 31, 2020.

(51) Int. Cl.
*G02B 6/12* (2006.01)
*G02B 6/13* (2006.01)
(52) U.S. Cl.
CPC ............ *G02B 6/1203* (2013.01); *G02B 6/13* (2013.01)

(58) Field of Classification Search
CPC ............ G02B 6/12; G02B 6/1203; G02B 6/13
See application file for complete search history.

(56) References Cited

U.S. PATENT DOCUMENTS 6,865,323 B2 * 3/2005 Samiec ............. G02B 6/12016
385/39
6,954,566 B2 * 10/2005 Johannessen ...... G02B 6/12014
385/39

(Continued)

FOREIGN PATENT DOCUMENTS

CN 102193149 A 9/2011
WO 2018036035 A1 3/2018

(Continued)

OTHER PUBLICATIONS

International Preliminary Report on Patentability received for PCT application No. PCT/IB2021/056906, mailed on Feb. 9, 2023, 09 Pages.

(Continued)

*Primary Examiner* — Tina Wong

(57) ABSTRACT

A thermal compensator, for use in connection with arrayed waveguide grating (AWG) modules which are, in turn, utilized in conjunction with wavelength multiplexing and de-multiplexing within optical networks, is disclosed. The thermal compensator comprises a bow-shaped frame member and a central bar member. The bow-shaped frame member is characterized by a higher coefficient of thermal expansion than that of the central bar member such that the bow-shaped frame member can expand and contract at variable rates compared to that of the central bar member under certain temperature conditions. The bow-shaped frame member is adapted to be attached to a movable section of an athermal arrayed waveguide grating (AAWG) module such that the expansion and contraction movements of the bow-shaped member influence the movement of a movable (Continued)

section of the AAWG module in order to maintain the proper focus of the AAWG module across disparate temperature conditions.

16 Claims, 14 Drawing Sheets

(56) References Cited

U.S. PATENT DOCUMENTS

| | | | |
|---|---|---|---|
| 8,457,459 B2 * | 6/2013 | Hasegawa | G02B 6/12033 385/39 |
| 11,619,780 B2 * | 4/2023 | Zhang | G02B 6/12033 385/37 |
| 2001/0033714 A1 * | 10/2001 | Delisle | G02B 6/1203 385/33 |
| 2004/0208417 A1 | 10/2004 | Purchase | |
| 2004/0234200 A1 | 11/2004 | Jennings | |
| 2010/0272394 A1 * | 10/2010 | Okamoto | G02B 6/12033 385/37 |
| 2012/0002918 A1 * | 1/2012 | Kawashima | G02B 6/1203 264/1.24 |
| 2014/0112621 A1 * | 4/2014 | Shen | G02B 6/12033 385/37 |
| 2015/0309257 A1 | 10/2015 | Huang | |
| 2018/0164518 A1 * | 6/2018 | Hu | G02B 6/1203 |
| 2021/0041626 A1 * | 2/2021 | Kim | G02B 6/1203 |

FOREIGN PATENT DOCUMENTS

| | | |
|---|---|---|
| WO | 2019200961 A1 | 10/2019 |
| WO | 2020176089 A1 | 9/2020 |

OTHER PUBLICATIONS

International Search Report and Written Opinion received for PCT application No. PCT/IB2021/056906, mailed on Nov. 4, 2021, 10 Pages.

* cited by examiner

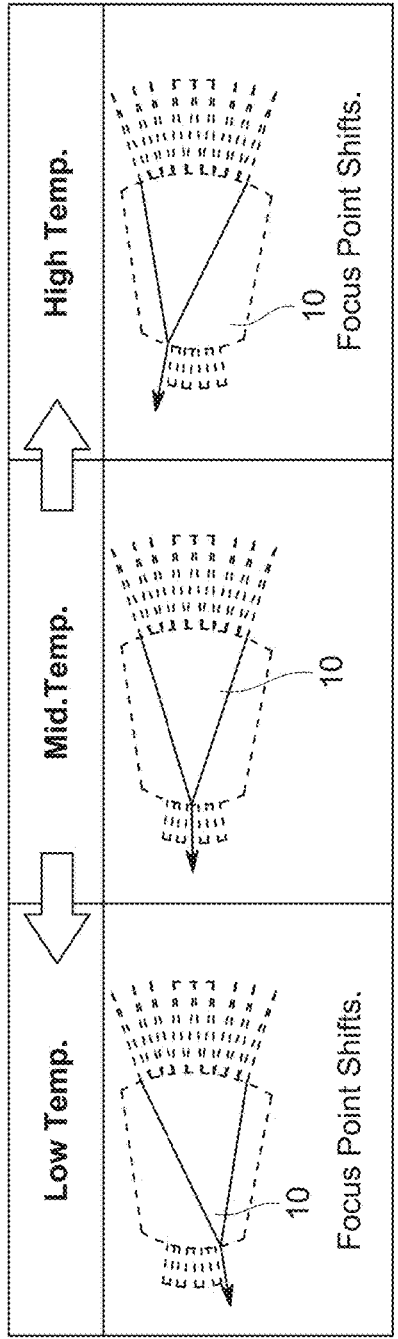
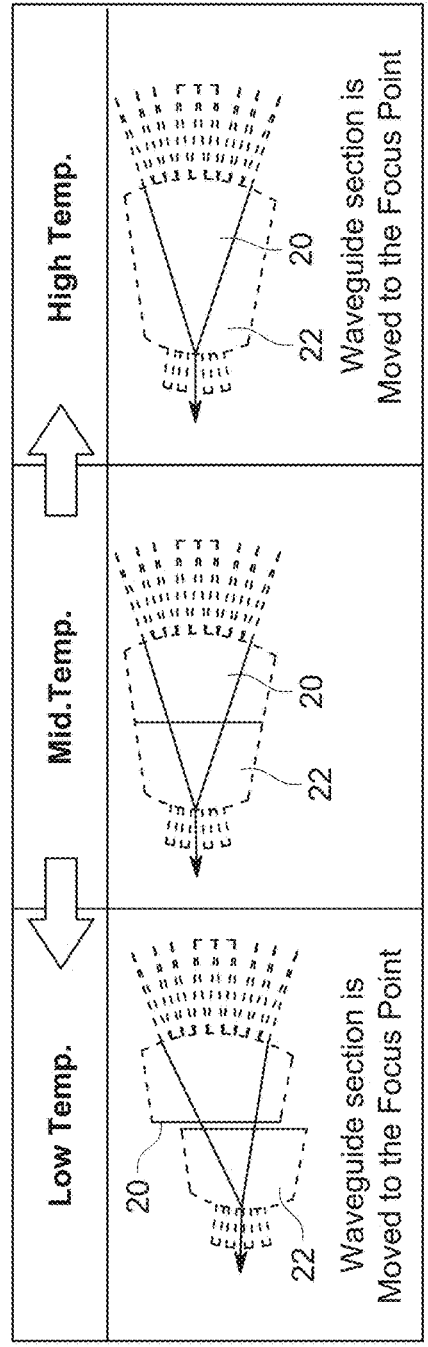

VARIABLE DUAL-DIRECTIONAL THERMAL COMPENSATOR FOR ARRAYED WAVEGUIDE GRATING (AWG) MODULES

RELATED APPLICATIONS

This application claims priority to and is a 35 U.S.C. § 371 U.S. National Stage Application of International Application No. PCT/IB2021/056906, filed Jul. 29, 2021, which claims priority to U.S. Provisional Patent Application No. 63/059,204, filed Jul. 31, 2020, which is are incorporated herein by reference in their entireties.

TECHNICAL FIELD

The present invention relates to thermal compensators, and more particularly to a new and improved thermal compensator which can be utilized in conjunction with arrayed waveguide grating (AWG) modules which are, in turn, utilized in conjunction with wavelength multiplexing and de-multiplexing within optical networks.

BACKGROUND ART

In connection with AWG modules which are utilized in conjunction with wavelength multiplexing and de-multiplexing within optical networks, it has been found that as the temperature varies, the working wavelength also varies, thereby affecting performance. There are currently two types of AWG modules—the first type of AWG module is a known as a thermal AWG module wherein a heater and a thermocouple are utilized in order to maintain the temperature of the module constant. This clearly improves the wavelength stability, however, the unit consumes power, and with additional components introduced into the system, the reliability of the overall system is somewhat reduced. The second type of AWG module is a non-heated or athermal arrayed waveguide grating (AAWG) module. One advantage of an AAWG module is that it is effectively a passive structure in that the power consumption is zero. One significant drawback, however, is that an AAWG module is only reliably operative within a fairly well-established working temperature range. Currently, for example, that temperature range extends from −15° C. to 70° C., although uses have been reported of such AAWG modules being utilized within a temperature range of −40° C. to 85° C. However, it has also been reported that a significant drawback in utilizing such AAWG modules within such temperature ranges has led to greater wavelength instability which is known as wavelength offset as established by means of the International Telecommunication Union (ITU).

In an effort to compensate for such wavelength instability utilizing AAWG modules, various non-heating thermal compensators have been utilized. For example, with reference being made to FIGS. 1A-2C, it is seen that, as illustrated within FIGS. 1A-1C, which illustrates a conventional AWG module 10, as the temperature varies between low temperature conditions, through mid-temperature conditions, to high temperature conditions, the focal point of the conventional AWG module 10 shifts. Accordingly, as illustrated within FIGS. 2A-2C, there is illustrated an AAWG module 20 which is provided with a thermal compensator, not shown, which causes a forward section 22 of the AAWG module 20 to be physically or mechanically moved or displaced so as to effectively re-focus the focal point of the AAWG module 20 such that the resulting outputted focal point is effectively rendered constant, regardless of the temperature within which the non-heated or athermal arrayed waveguide grating AAWG module 20 is being utilized. It has also been known, however, that the thermally-induced wavelength changes are non-linear across the widely variable temperature range of operation, meaning that the mechanical movement or displacement compensation of, for example, the forward section 22 of AAWG module 20, is different when the AAWG module 20 is operating within a relatively cold environment rather than when the AAWG module 20 is operating within a relatively warm environment.

An example of a conventional variable two-directional thermal compensator is illustrated within FIG. 3 and is indicated by the reference character 30. More particularly, it is seen that the thermal compensator 30 comprises a frame member 32 which is adapted to be connected to or engaged with the movable or displaceable section of the AAWG module and which effectively comprises a three-dimensional solid block having the configuration of a rectangular parallelepiped, and a screw 34 which is adapted to be connected to or engaged with the non-movable or non-displaceable section of the AAWG module. The frame member 32 and the screw 34 are fabricated from specifically predeterminedly different materials which are characterized by substantially different coefficient of thermal expansion (CTE) properties such that as the temperature of the environment within which the AAWG module is operating, the frame member 32 will expand or contract at a greater rate relative to the expansion or contraction of the screw so as to accordingly displace or move the movable or displaceable section of the AAWG module in a non-linear manner from cold to warm environments. Unfortunately, it has been found, however, that despite the fabrication of such temperature compensators from specifically selected materials exhibiting appropriately different CTE properties, such prior art designs have not been able to in fact provide the necessary thermal compensation required for enabling the AAWG modules to operate within significantly different or wider temperature ranges. This is because the desired movement or displacement of the movable section of the AAWG module when the AAWG module is operating within an environment characterized by relatively cool or cold temperatures, is different from the desired movement or displacement of the movable section of the AAWG module when the AAWG module is operating within an environment characterized by relatively warm or hot temperatures. The prior art design of a thermal compensator could not generate significant enough difference between expansion and contraction so as to meet the compensation requirement for AAWG modules operating within, or going from, cool and/to warm environments.

Accordingly, a need therefore exists in the art for a new and improved AAWG module wherein improved thermal compensation can in fact be achieved such that the AAWG module can in fact be utilized within temperature ranges or environments which may exhibit significantly different or disparate temperatures. In other words, the AAWG module can in fact be utilized within temperature ranges or environments which may exhibit significantly different or disparate temperatures as a result of the use of a thermal compensator which permits the AAWG module to expand at a rate which is greater, when the AAWG module is operating within relatively warm or hot temperature environments, than the rate at which the AAWG module will contract when the AAWG module is operating within relatively cool or cold temperature environments.

SUMMARY

The foregoing needs have been achieved by means of the present invention wherein, in accordance with the principles and teachings of the present invention, a new and improved thermal compensator has been developed and is seen to comprise, in its basic form, a frame member which has the configuration of an expansible and contractible bow, in lieu of the conventional solid block rectangular parallelepiped. A central bar member is disposed internally within the bow frame member (or simply frame member) with arms of the central bar member fixedly secured opposing sections of the bow frame member, while a far end of the central bar member is engaged with a screw fixedly mounted within a far end of the bow frame member. The bow frame member and the central bar member are fabricated from specifically predeterminedly different materials that have different CTE properties. In this manner, the bow frame member is capable of expanding at a substantially greater rate than the central bar member will expand under elevated temperature conditions, however, conversely, the bow frame member is effectively constrained by the central bar member so as to only be capable of contracting at the rate that the central bar member contracts under relatively low temperature conditions. This is precisely the type of thermal compensation that is desired because, as has been noted, the movable section of the AAWG module, to which the thermal compensator is adapted to be connected, needs to contract at a different rate than that at which it expands so as to maintain the proper focal point of the AAWG module. It is also noted that in order to achieve precise movements or displacements of the movable or displaceable section of the AAWG module in order to maintain the proper focal point of the AAWG module, the bow frame member of the thermal compensator may have various different geometrical configurations or shapes, the bow frame member of the thermal compensator may be fabricated from various different materials, wherein such various different materials all exhibit different coefficient of thermal expansion properties, and the size or thickness dimensions of various sections of the bow frame member may be varied.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 1A is a schematic view of a conventional PRIOR ART AWG module wherein the focal point of the AWG module is schematically illustrated as having shifted in a first particular direction as a result of the AWG module being utilized within a relatively low temperature range environment;

FIG. 1B is a schematic view of the conventional PRIOR ART AWG module as disclosed within FIG. 1a wherein the focal point of the AWG module is schematically illustrated as not having shifted at all from its desired predetermined focal point as a result of the AWG module being utilized within a mid-temperature range environment;

FIG. 1C is a schematic view of the conventional PRIOR ART AWG module as disclosed within FIG. 1b wherein the focal point of the AWG module is schematically illustrated as having shifted in a second opposite direction as a result of the AWG module being utilized within a relatively high temperature range environment;

FIG. 2A is a schematic view of a conventional PRIOR ART AAWG module wherein the focal point of the AAWG module is schematically illustrated as being maintained constant as a result of a front portion of the AAWG module being moved or displaced a predetermined distance in a first direction, by means of a thermal compensator, so as to effectively compensate for the shift in the focal point of the AAWG module that would normally have occurred due to the fact that the AAWG module is being utilized within a relatively low temperature range environment;

FIG. 2B is a schematic view of the conventional PRIOR ART AAWG module as disclosed within FIG. 2A wherein the focal point of the AAWG module is schematically illustrated as being maintained constant without the need for moving the front portion of the AAWG module due to the fact that the AAWG module is being utilized within a mid-temperature range environment;

FIG. 2C is a schematic view of the conventional PRIOR ART AAWG module as illustrated within FIG. 2A wherein the focal point of the AAWG module is schematically illustrated as being maintained constant as a result of the front portion of the AAWG module being moved or displaced, by means of a thermal compensator, a predetermined distance in the opposite direction so as to effectively compensate for the shift in the focal point of the AAWG module that would normally have occurred due to the fact that the AAWG module is being utilized within a relatively high temperature range environment;

DETAILED DESCRIPTION OF THE PREFERRED EMBODIMENTS

Figure 3:
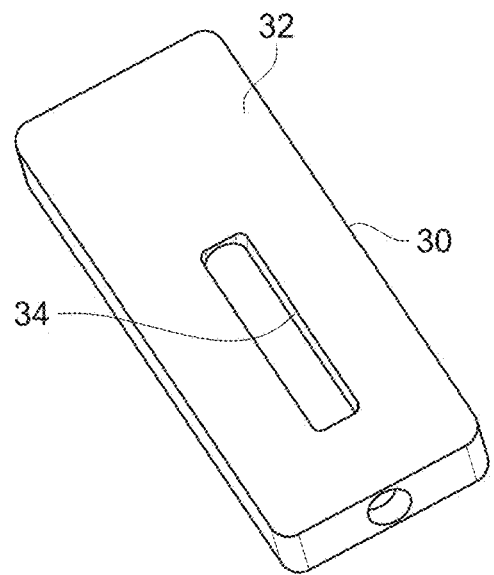
FIG. 3 is a perspective view of a conventional, PRIOR ART, thermal compensator which has been utilized in conjunction with AAWG modules.
Figure 4:
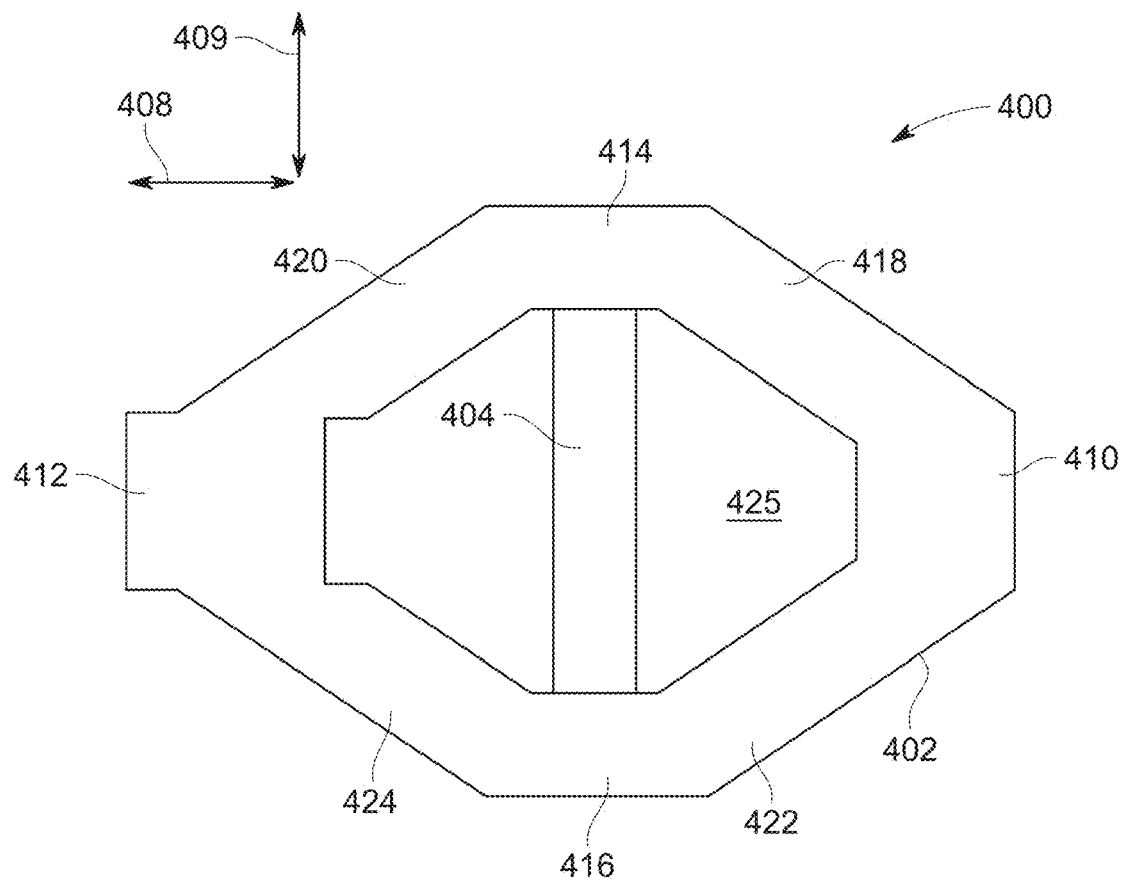
FIG. 4 is a schematic view of a first embodiment of a new and improved variable dual-directional thermal compensator which has been developed in accordance with the principles and teachings of the present invention so as to be advantageously utilized in conjunction with AAWG modules.

With reference now being made to the drawings, and more particularly to FIG. 4 thereof, an illustrative example of the new and improved variable dual-directional thermal compensator for use in conjunction with AAWG modules is disclosed and is generally indicated by the reference character 400. More particularly, it is seen that the new and improved variable dual-directional thermal compensator 400 comprises a bow-shaped frame member 402 (also referred to simply as "frame member"), a central bar member 404 (also referred to as a "cross bar member"), and optionally a screw (not shown). Still more particularly, it is seen that the frame member 402 has a geometrical configuration which is substantially that of a bow comprising an axially elongated octagon as defined with respect to, or about, a longitudinally oriented axis 408. The central bar member is oriented in the laterally (or vertically) oriented axis 409 in the example of FIG. 4. The same axis references may be used for the subsequent figures. The lateral or vertical direction may also be called the transverse direction in some embodiments. On the longitudinal axis, the frame member 402 is seen to comprise a first end section 410 and a second oppositely disposed end section 412. In some embodiments, the first end section 410 is adapted to be movable, and the second oppositely disposed end section 412 is adapted to be fixed. On the lateral axis the frame member 402 comprises a first side section 414, a second side section 416, first and second leg sections 418,420 respectively interconnecting the first side section 414 to the first and second end sections 410,412, and third and fourth leg sections 422,424 respectively interconnecting the second side section 416 to the first and second end sections 410,412, wherein all of the aforenoted sections and leg portions of the frame member 402 define a central hollow portion 425.

As can therefore be appreciated, due to the unique geometrical structural configuration of the frame member 402, as temperatures become elevated, the frame member 402 will effectively elongate or expand axially, with respect to longitudinally extending axis 408, as permitted by means of the structural interconnections defined between the first side section 414, the second side section 416, the first and second leg sections 418, 420 respectively interconnecting the first side section 414 to the first and second end sections 410, 412, and the third and fourth leg sections 422, 424 respectively interconnecting the second side section 416 to the first and second end sections 410, 412. It will be further appreciated that as the frame member 402 effectively elongates or expands axially, the first and second side sections 414, 416 will effectively move toward each other, again, as permitted by means of the first and second leg sections 418, 420 respectively interconnecting the first side section 414 to the first and second end sections 410, 412, and the third and fourth leg sections 422, 424 respectively interconnecting the second side section 416 to the first and second end sections 410, 412. It will be further appreciated that when the AAWG module, with which the thermal compensator 400 is to be utilized, is subjected to, or operating within, relatively cool or cold temperatures, the reverse movement or displacement of the frame member 402 occurs, that is, the frame member 402 will axially contract. It is therefore seen that the structural configuration characterizing the frame member 402 provides the frame member 402 with unique flexibility and resiliency so as to precisely perform needed movements or displacements of a movable section of an AAWG module, as will be discussed more fully hereinafter.

In accordance with further teachings and principles of the present invention, the frame member 402 and the central bar member 404 are fabricated from materials having specific, different, predetermined or known CTE properties with the frame member 402 being fabricated from a material which exhibits a greater or higher CTE than that of the central bar member 404. In this manner, it can therefore be appreciated that when the AAWG module is being operated within an environment which is experiencing relatively warm or hot temperature conditions, the frame member 402 will effectively be free to expand or elongate axially in accordance with its CTE properties, whereas, conversely, when the AAWG module is being operated within an environment which is experiencing relatively cool or cold temperature conditions, the frame member 402 will effectively be somewhat constrained or retarded in its axial (lateral 409) contraction movements or displacements in view of the fact that the end sections of the frame member 402 are fixedly secured to the central bar member 404 at the side ends 414, 416, and since the CTE properties of the central bar member 404 are less than that of the frame member 402, the axial (lateral 409) contraction of the central bar member 404 proceeds at a smaller or slower rate as compared to the axial (lateral 409) contraction of the frame member 402, whereby the overall contraction of the frame member 402 is achieved at a lower rate than its axial thermal expansion or elongation. As has been noted hereinbefore, these movements or displacements are desired and required in order to preserve the proper focal point of the AAWG module.

Figure 5A:
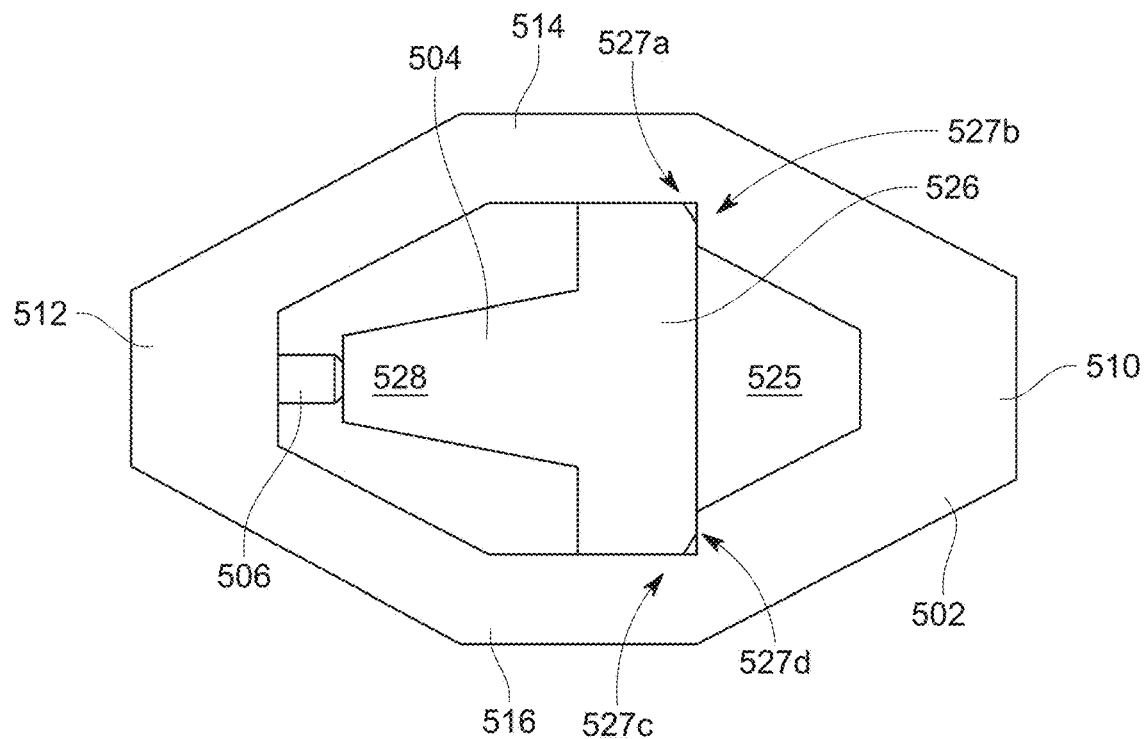
FIG. 5A is a schematic view of another embodiment of a new and improved variable dual-directional thermal compensator including a central bar member and frame member wherein the central bar member is fixed to the frame member at opposing sides and the central bar member is adapted to be engaged with a screw coupling the central bar member to the frame member.
Figure 5B:
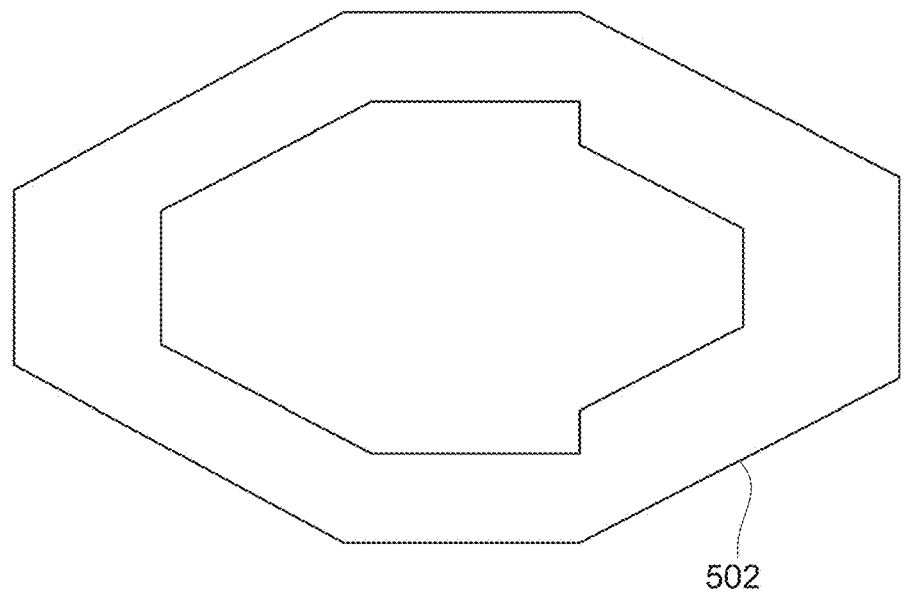
FIGS. 5B-C are schematic views of the frame member and central bar member of FIG. 5A to show details of the components.
Figure 5C:
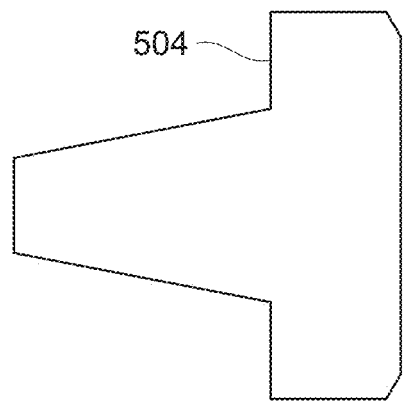

In one embodiment, as can also be seen from FIGS. 5A-C, the central bar member 504 is disposed within a hollow central interior portion 525 of the frame member 502 and has a substantially T-shaped configuration which is seen to comprise a first end or head portion 526 with extended arms that are fixedly secured to sides 514, 516 of the frame member 502, while a second opposite end or foot portion 528 is adapted to be engaged with a first end portion of the screw 506 which has its oppositely disposed second end portion fixedly mounted within the second end section 512 of the frame member 502. While the central bar member 504 is seen oriented closer to the first end section 511 of the frame member 502, in other embodiments, the central bar member 504 may be closer to the middle and toward the second end section 512 of the frame member 502. In the example of FIG. 5A, the head portion 526 is secured at four surface areas 527a-d such that the head portion 526 is bounded on two sides. In other embodiments, the head portion 526 may be secured only to the side surface areas 527a, 527c and not to surface areas 527b, 527d, for example with a shorter central bar member 504. Mating the head portion 526 with the frame member 502 both laterally and longitudinally to the frame member 502 may provide stability in resisting deformation on the lateral and longitudinal axes. The screw 506 is threadedly adjusted within the fixed end section 512 of the frame member 502 so as to maintain the position of the first end or head portion 526 relative to the first end section 510 of the frame member 502.

It is to be noted that when the AAWG module is operatively disposed within or exposed to relatively warm or hot temperature conditions, the frame member 502 will axially expand or elongate to such an extent that the second opposite end or foot portion 528 of the central bar member 504 will disengage from the first end portion of the screw 506, however, and conversely, when the AAWG module is operatively disposed within or exposed to relatively cool or cold temperature conditions, the frame member 502 will axially contract, as permitted by the central bar member 504 in accordance with the differential between their CTEs, such that the second opposite end or foot portion 528 of the central bar member 504 will again engage from the first end portion of the screw 506. It is to be noted still further that the screw 506 is usually fabricated from a material which is characterized by means of a relatively large Young's Modulus and a small CTE. Accordingly, it has been found that when the second opposite end or foot portion 528 of the central bar member 504 engages the first end portion of the screw 506, the relative hardness or stiffness of the screw 506 may possibly cause indentations or other damage to the second opposite end or foot portion 528 of the central bar member 504 (for example, where the central bar member 504 joins the frame member 502 at locations 527b, 527d). In some embodiments, a protection block (not shown) may be provided to prevent this condition from occurring.

Figure 6A:
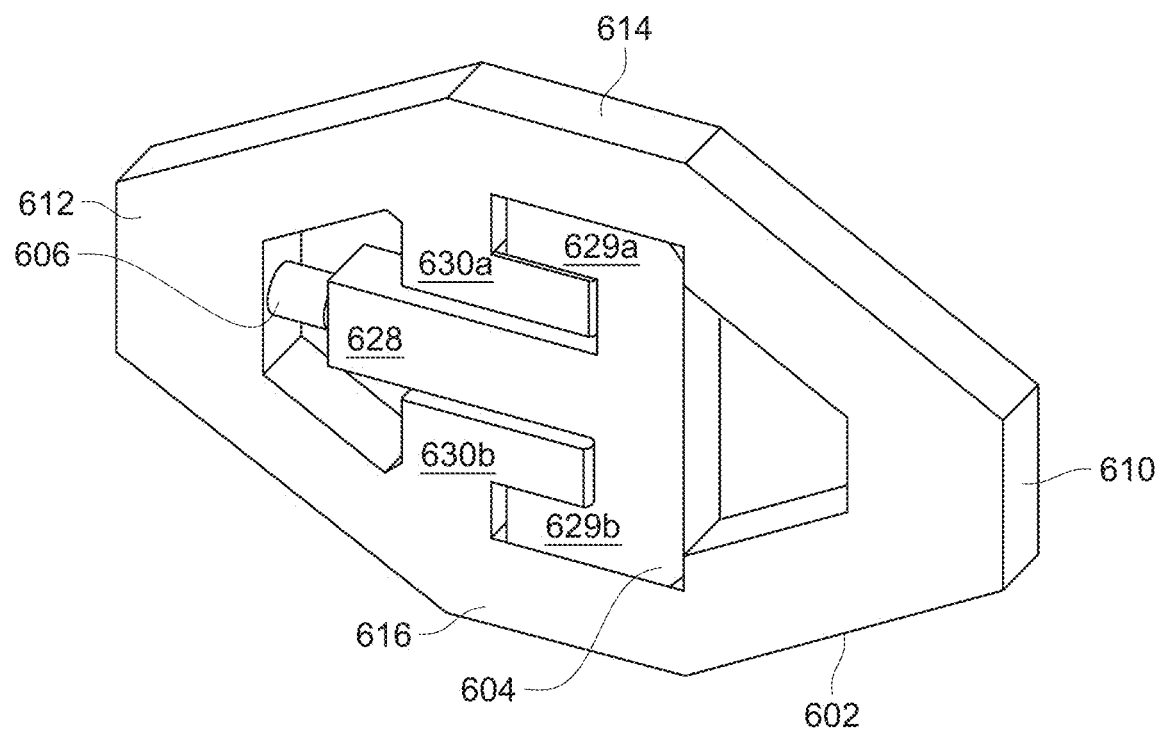
FIG. 6A is a schematic view of another embodiment of a new and improved variable dual-directional thermal compensator including a central bar member wherein the central bar member is fixed to the frame member using half-lap or cross-lap bonding to the frame member.
Figure 6B:
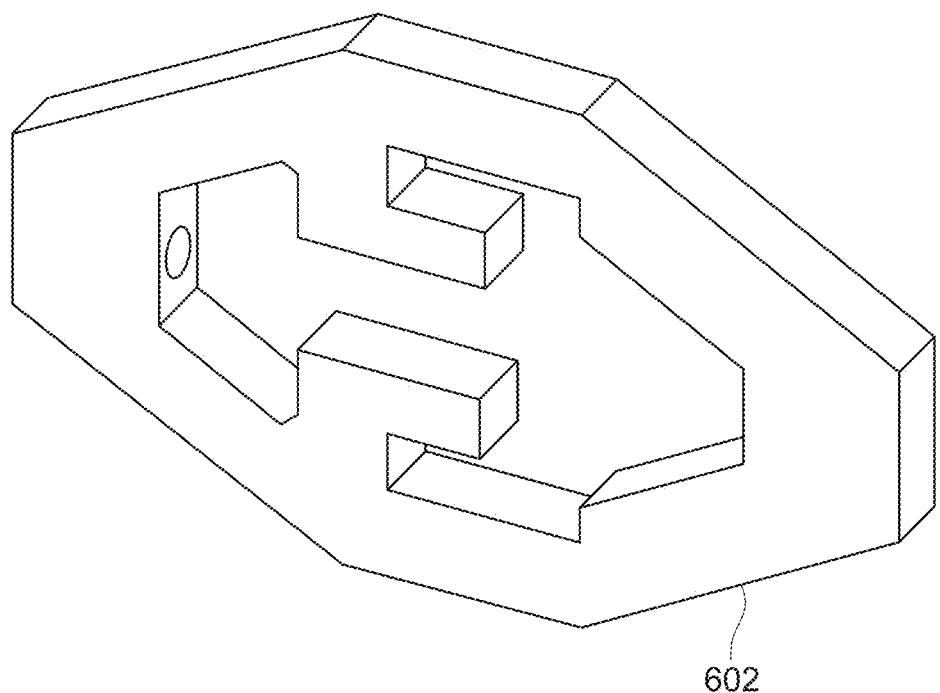
FIGS. 6B-C are schematic views of the frame member and central bar member of FIG. 6A to show details of the components.
Figure 6C:
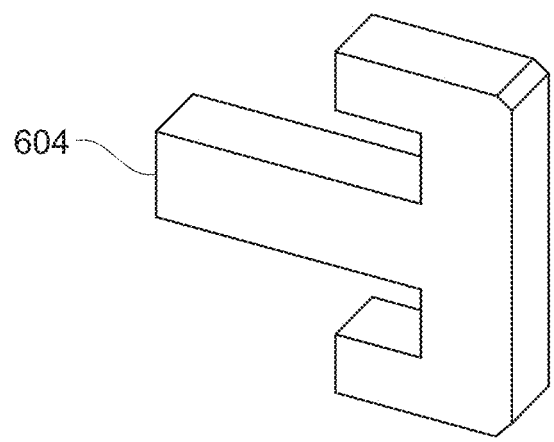

With reference to FIGS. 6A-C, another embodiment of a frame member 602 and central bar member 604, which may be developed in accordance with the principles and teachings of the prevent invention, is provided and seen to comprise L-shaped extensions in the central bar member 604 and frame member 602. The central bar member 604 is secured to the frame member 602 at opposing sides 614, 616 of the frame member 602. The leg portion/segment 628 extends toward the far distal end of the frame member 612 (relative to the near end 610) coupled to the frame member 602 via the screw 606. The central bar member 604 has a substantially T-shaped configuration, with L-shaped arms 629a-b extending on the two sides of the central bar member 604. On the frame member 602 are corresponding L-shaped extensions 630a-b that mate to the surface on the central bar member 604. Because the central bar member 604 and frame member 602 are coupled at the lateral-facing surfaces, the forces acting on each other (e.g., due to different rates of contraction and expansion of the material) are in the vertical directions. Accordingly, the central bar member 604 tends to resist deformation and expansion of the frame member 602 in the vertical directions. With the contacts on both the outward facing and inward facing directions, additional stability is provided opposing those two directions. In some embodiments, there may be small gaps or spaces between the central bar member 604 and frame member 602 that may allow more expansion and contraction in the longitudinal direction.

Figure 7A:
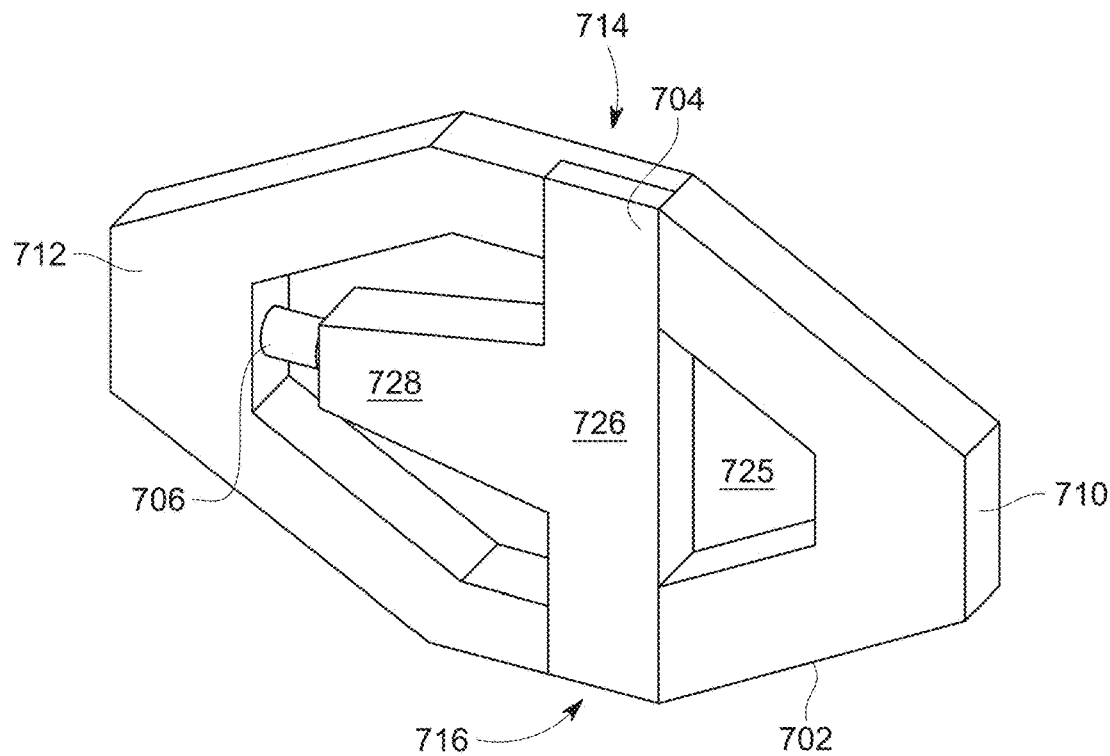
FIG. 7A is a schematic view of another embodiment of a new and improved variable dual-directional thermal compensator including a central bar member wherein the central bar member is fixed to the frame member using cross bonding to the frame member.
Figure 7B:
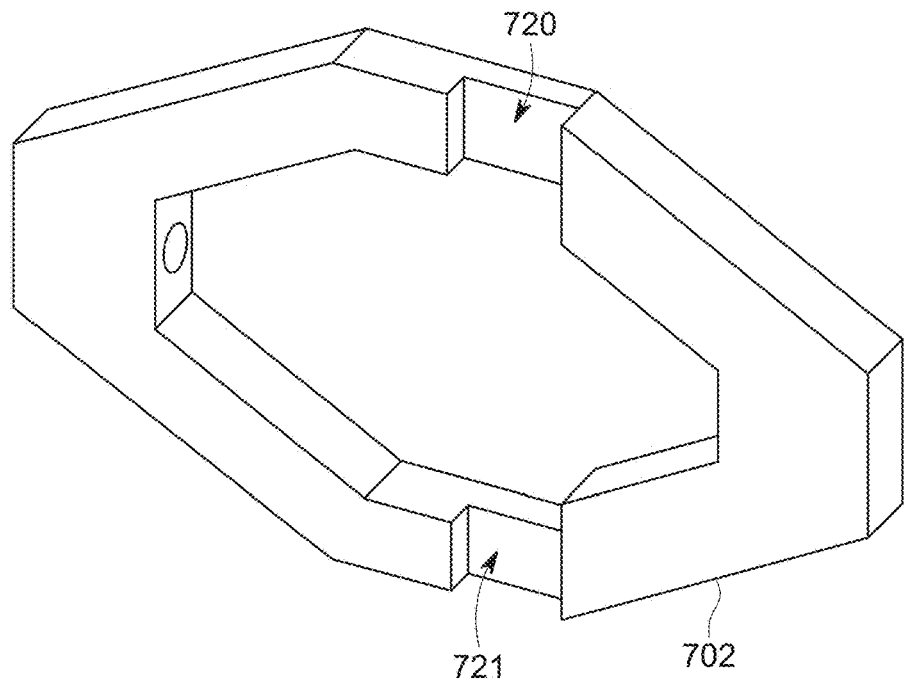
FIGS. 7B-C are schematic views of the frame member and central bar member of FIG. 7A to show details of the components.
Figure 7C:
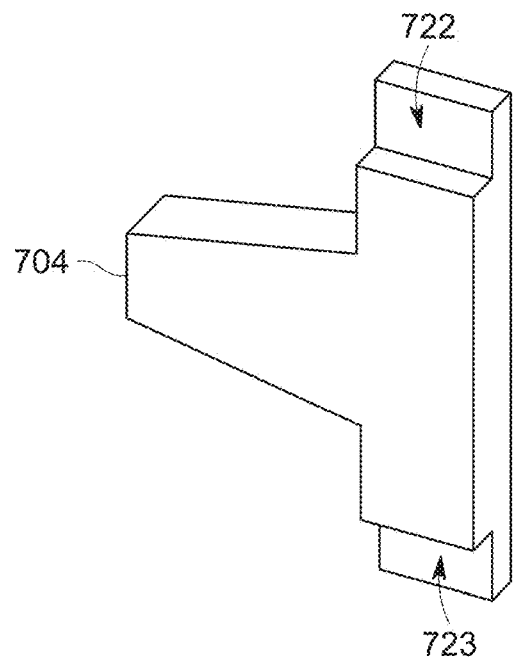

With reference to FIGS. 7A-C, another embodiment of a frame member 702 and central bar member 704, which may be developed in accordance with the principles and teachings of the present disclosure, is provided. As before with FIGS. 6A-C, the central bar member 704 is secured to the frame member 702 at the opposing sides 714, 716. The leg portion/segment 728 of the central bar member 704 extends toward the far end of the frame member 712 (relative to the near end 710) coupled to the frame member 702 via a screw 706. The central bar member 704 has a substantially T-shaped configuration with the leg portion 728 having a V-shape. The arms of the central bar member 704 may extend to the full height of the frame member 702. The connection at the sides 714, 716 between the central bar member 704 and the frame member 702 may be described as a half-lap, t-halving join, or a notch-and-groove join, etc. The details of the connection are further described below with reference to FIGS. 7B-C.

FIG. 7B shows the same perspective view as FIG. 7A without the screw 706 and central bar member 704 to show details of the frame member 702 that are obscured by the screw 706 and central bar member 704. FIG. 7C is a perspective view showing the second face of the central bar member 704. In the view of FIG. 7C, the grooves 720, 721 on the frame member 702 match the grooves 722, 723 on the central bar member 704. In the example of FIGS. 7A-C, the mating surfaces sit flush with each other when they are connected. For example, the side surfaces 714, 716 are flush between the central bar member 704 and frame member 702. The front and rear face surfaces of the configuration including the central bar member 704 and frame member 702 also sit flush when the components are connected.

Figure 8A:
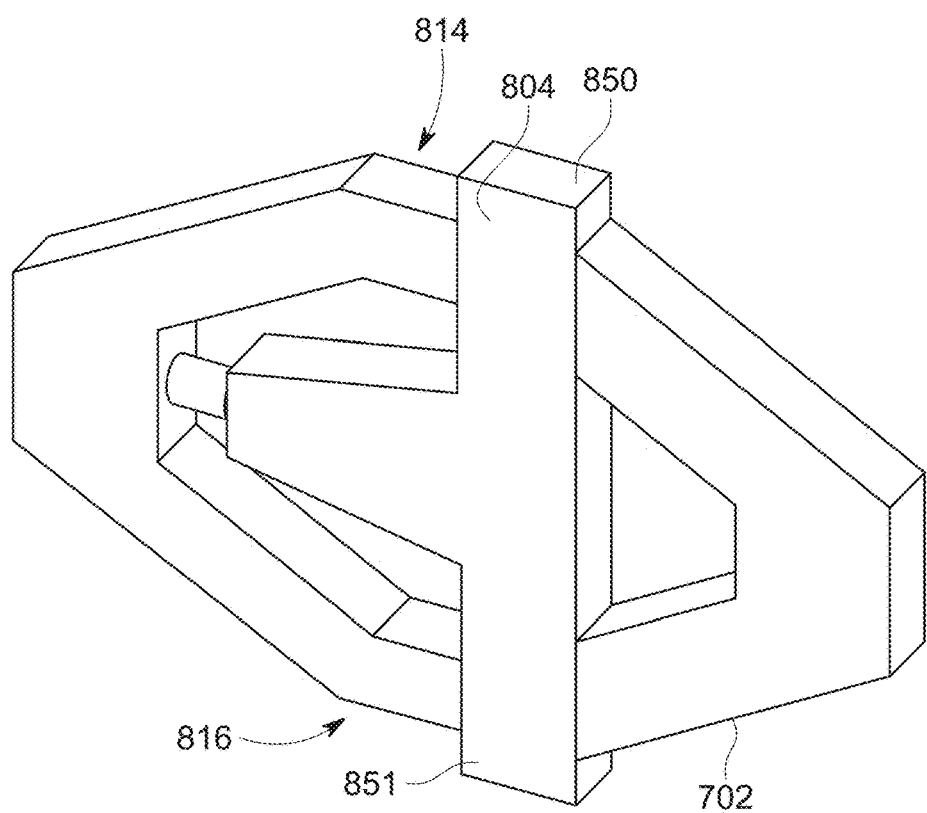
FIG. 8A is a schematic view of another embodiment of a new and improved variable dual-directional thermal compensator including a central bar member wherein the central bar member is fixed to the frame member (e.g., frame member as shown in FIG. 7A) using cross bonding to the frame member wherein the frame member does not include grooves for the central bar member.
Figure 8B:
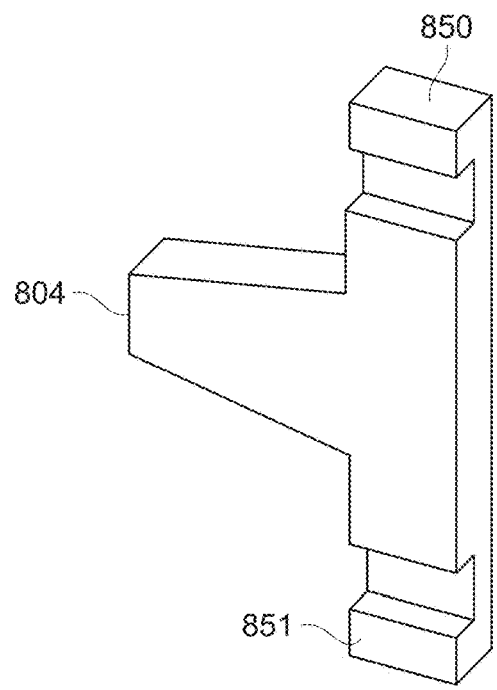
FIG. 8B is a schematic view of the central bar member of FIG. 8A to show details of the component.

With reference to FIGS. 8A-C, another embodiment is provided. The configuration is based on the frame member 702 of FIG. 7A. The central bar member 804 resembles the central bar member 704 in FIG. 7C, with the addition of material at the end of the arms 850, 851. Whereas the configuration shown in FIG. 7A shows a flush side edge surface 714, 716, the arms of the central bar member 804 extends beyond the edge of the frame member 702. In comparison to the configuration of FIG. 7A, the additional material at the ends 850, 851 of the central bar member 804 may increase the resistance to expansion of the frame member 702 because the sides 814, 816 of the frame member are constrained in the outward expansion by ends 850, 851 of the central bar member 804.

Figure 9A:
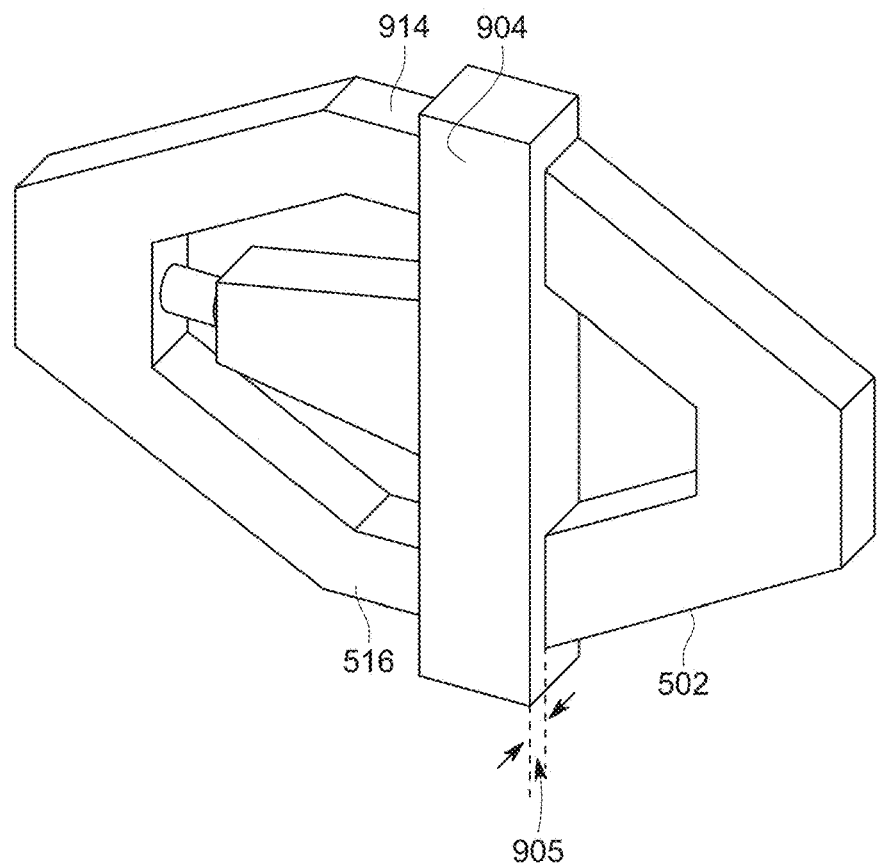
FIG. 9A is a schematic view of another embodiment of a new and improved variable dual-directional thermal compensator including a central bar member wherein the central bar member is fixed to the frame member (e.g., frame member of FIG. 5B) using cross bonding to the frame member wherein the frame member does not include grooves for the central bar member.
Figure 9B:
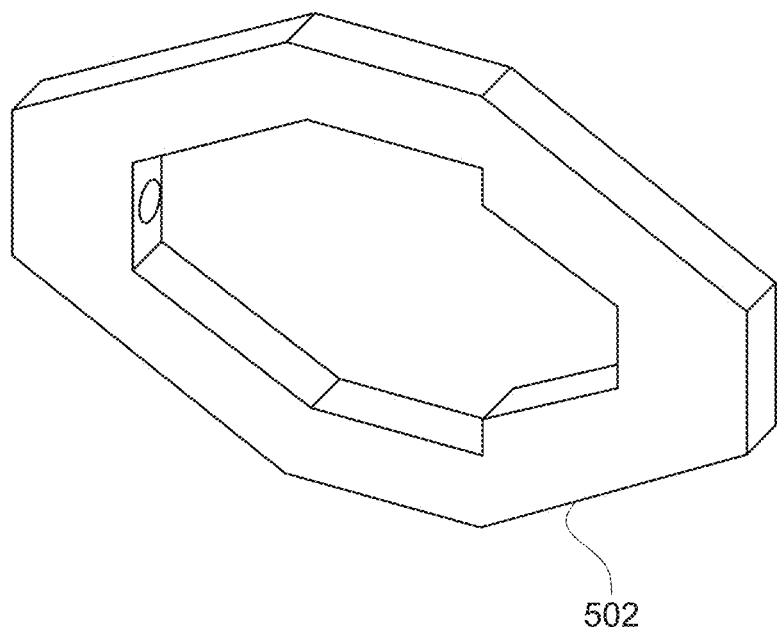
FIGS. 9B-C are a schematic view of the central bar member and frame member of FIG. 9A to show details of the components.
Figure 9C:
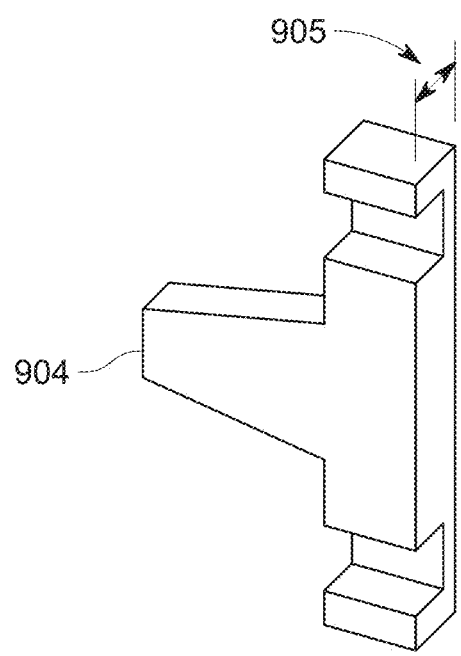

With reference to FIGS. 9A-C, another embodiment is provided. The configuration is based on the frame member 502 of FIG. 5A. The central bar member resembles the central bar member 804 of FIG. 8A, with a greater depth of material 905 for the central bar member 904. Whereas the configuration shown in FIG. 8A shows the face surfaces flush between the central bar member 804 and frame member 702, in the configuration of FIG. 9A, the central bar member 904 has additional depth of material 905 such that the central bar member 904 projects above the face of the frame member 502. The shape of the central bar member 904 with the additional depth of material 905 enables usage of the same frame member 502 from FIG. 5A. The frame member 502 has continuous side volumes without the groove areas 720, 721 found in the frame member of FIG. 7B.

It is lastly noted that the frame member (e.g., 402, 502, etc.), the central bar member (e.g., 404, 504, etc.), and the screw (e.g., 406, 506, etc.) may be fabricated from any one of a multitude of different materials which exhibit various different coefficients of thermal expansion (CTE) so as to achieve optimum expansion and contraction results. Examples of such materials are steel, iron, stainless steel, copper, aluminum, nickel, zinc, cobalt, magnesium, kovar, brass, lead, graphite, carbon, rubber, ceramic, wood, epoxy, anodized aluminum, tin, gold, palladium, silver, molybdenum, platinum, titanium, chromium, manganese, various plastics, alloys, polytetrafluoroethylene, polycarbonate, vinyl, and the like. The materials may be selected for their various properties including, for example, in addition to their coefficients of thermal expansion (CTE), their strength, force, flexibility, stiffness, yield strength, brittleness, and the like, in order to achieve predeterminedly required movements, reliability, and/or other performance characteristics. In addition, the attachment of the thermal compensator to the AAWG modules may be accomplished by any suitable means such as, for example, screws, epoxies, adhesives, bolts, nuts, posts, holes, slots, tongues and grooves, cams, gears, ratchets, magnets, solder, welds, wires, friction fits, snap fittings, latch fittings, and the like.

Figure 10A:
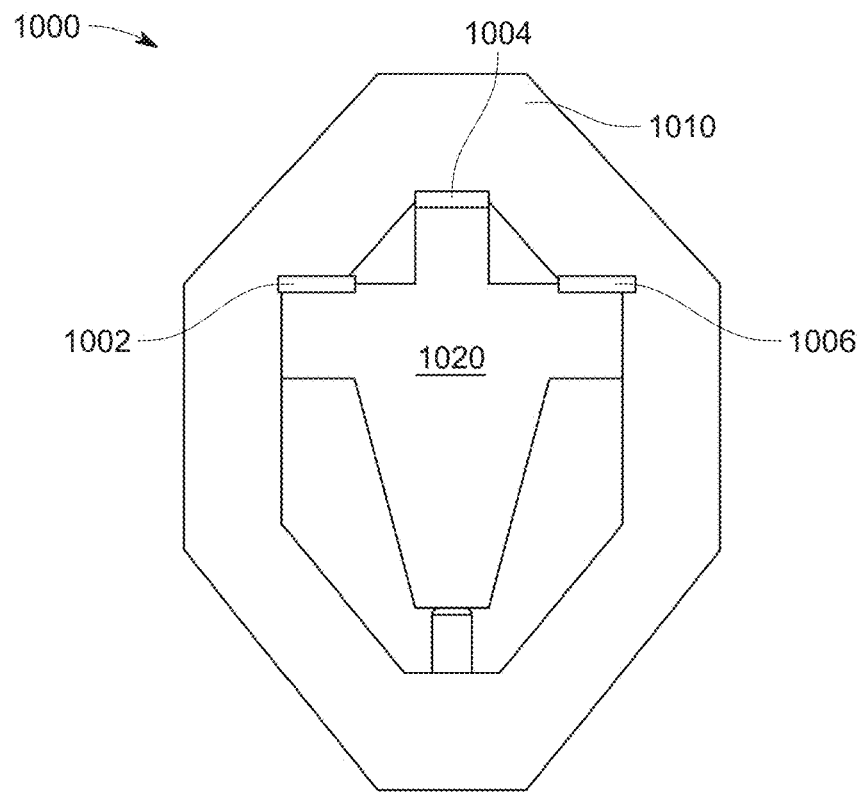
FIGS. 10A-B are schematic views of another embodiment of a new and improved variable dual-directional thermal compensator including a central bar member wherein the central bar member is fixed to the frame member (e.g., frame member of FIG. 5B) illustrating two example bonding configurations between the central bar member and the frame member.
Figure 10B:
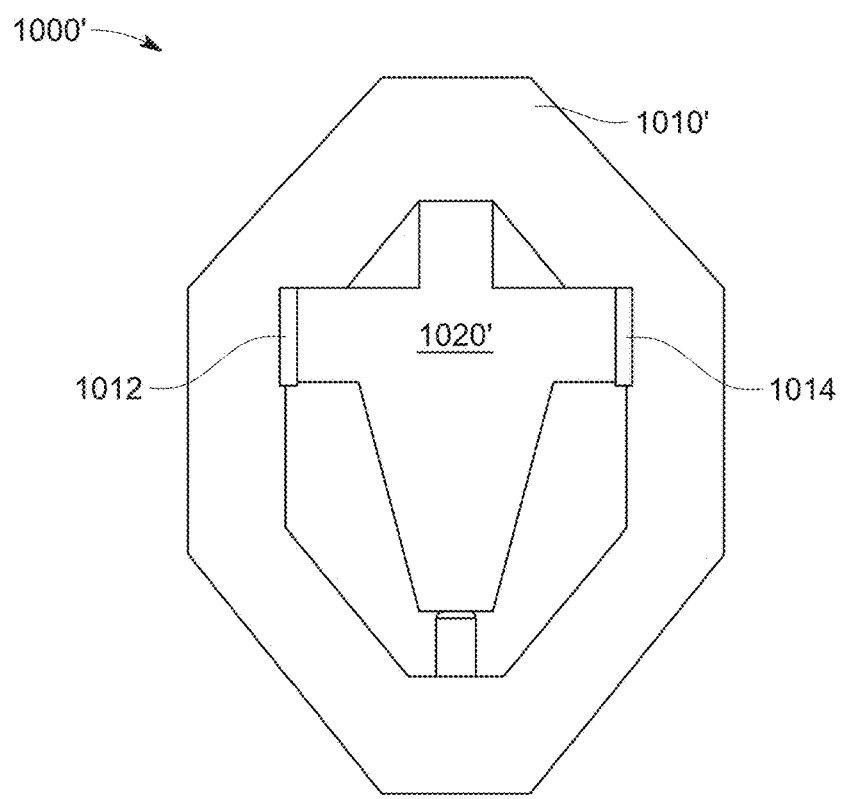

FIGS. 10A-B are schematic views of another embodiment of a new and improved variable dual-directional thermal compensator including a central bar member fixed to the frame member (e.g., frame member of FIG. 5B) illustrating two example bonding configurations between the central bar 1020 member and the frame member 1010. As illustrated the central bar member 1020 may have surfaces in contact with the frame member 1010. For these contact areas, various options exist for bonding the central bar member 1020 to the frame member 1010. In one example, the top sides (at contact areas 1002, 1004, 1006) may be bonded to the frame member 1010. In some instances, bonding may assist deformation in the longitudinal axis (upward and downward in the figures). For example in FIG. 10B, bonding the side surfaces 1012, 1014 may resist the cross deformation and expansion so that the frame member has greater expansion in the lateral directions. This may occur because expansion is constrained in one direction (sideways) and allowed freedom in the lateral direction, providing additional expansion. In this manner, a smaller package or smaller frame member may be used where a larger degree of thermal compensation is needed.

Figure 11:
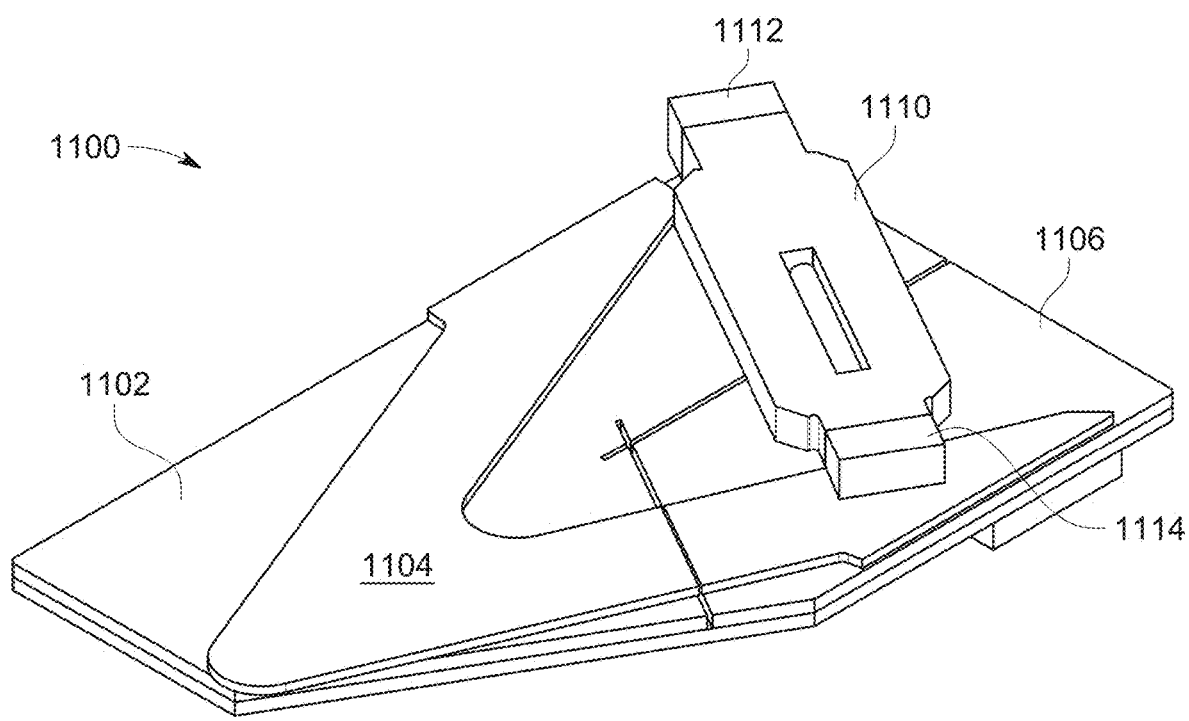
FIG. 11 is a schematic view of a thermal compensator coupled to a photonic chip at two segments of the photonic chip.

FIG. 11 is a schematic view of a thermal compensator 1110 coupled to a photonic chip 1102 at two segments of the photonic chip 1102. In the embodiment as shown, the photonic chip 1102 includes a moveable segment 1106 and a fixed segment 1104 of the arrayed waveguide grating. The moveable segment 1106 allows for the thermal compensation. As illustrated and discussed previously with respect to FIGS. 1A-C, temperature may affect the focus on the light beam through a medium such as a waveguide slab (e.g., 1104, 1106); the moveable segment 1106 allows the focus on the light beam to be shifted (see discussion with respect to FIGS. 2A-C) based on thermal compensation.

Coupled to the photonic chip is the thermal compensator 1110, which may include legs 1112, 1114. Leg 1112 is attached to a portion of the fixed phontonic chip 1102, while leg 1114 is attached to the moveable segment 1114. Thermal compensator 1110 may be any of the embodiments illustrated above. Under thermal stress, the thermal compensator 1110 expands lengthwise. As illustrated in FIG. 11, the thermal compensator 1112 must fit onto the chip, so more compact and smaller thermal compensators are desired where the desired offset or expansion is desired.

Figure 12A:
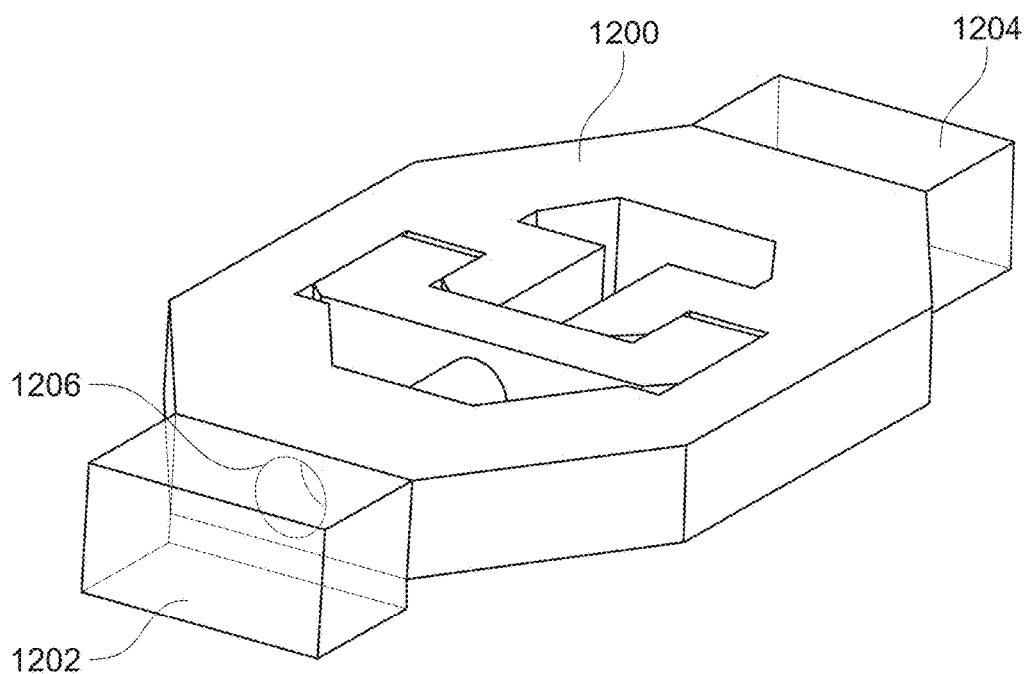
FIGS. 12A-B are schematic views of thermal compensators (12A) with glass attachments at ends of the thermal compensator and (12B) with integrated legs for coupling to a photonic chip.
Figure 12B:
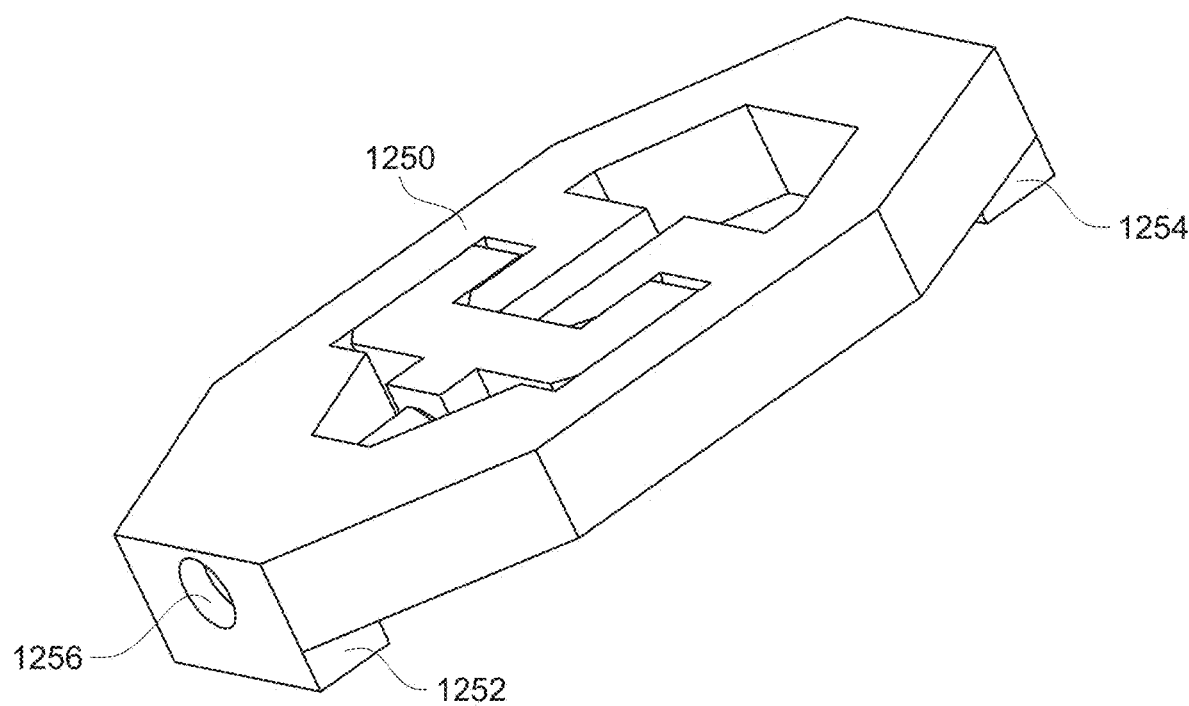

FIGS. 12A-B are schematic views of thermal compensators (FIG. 12A) with glass attachments at ends of the thermal compensator and (FIG. 12B) with integrated legs 1252, 1254 for coupling to a photonic chip. As shown in FIG. 11, the surface or substrate for attaching the thermal compensator may have a limited surface area to attach to. While the examples of FIGS. 12A-B show the particular embodiments, one skilled in the art will recognize that any thermal compensator may be any of the embodiments illustrated above.

FIG. 12A illustrates a thermal compensator with glass attachments 1202, 1204 at ends of the thermal compensator 1200. The glass legs 1202, 1204 are attached at the opposing ends of the thermal compensator 1200. At one end of the thermal compensator 1200 is a screw hole 1206 that may be used for adjustment of the screw that couples to the cross bar. As shown, the glass legs 1202, 1204 after being attached at the ends, may increase the total length size of the thermal compensator; as well, the glass leg 1202 may impede adjustment of the screw. In this instance, the screw must be fully adjusted prior to attachment of the legs 1202.0

FIG. 12B illustrates a thermal compensator 1250 with integrated legs 1256, 1254 on the thermal compensator 1200. Compared to the thermal compensator embodiment 1200 of FIG. 12A, the thermal compensator length 1250 does not extend past the ends. Also, the screw hole 1256 is accessible at all times because there no material (such as leg 1202) covering the screw hole. One benefit may be that adjustments may be made after the thermal compensator 1250 is affixed to a photonic chip. Therefore, adjustments may be performed either prior to or after affixing the thermal compensator to the photonic chip.

Figure 13A:
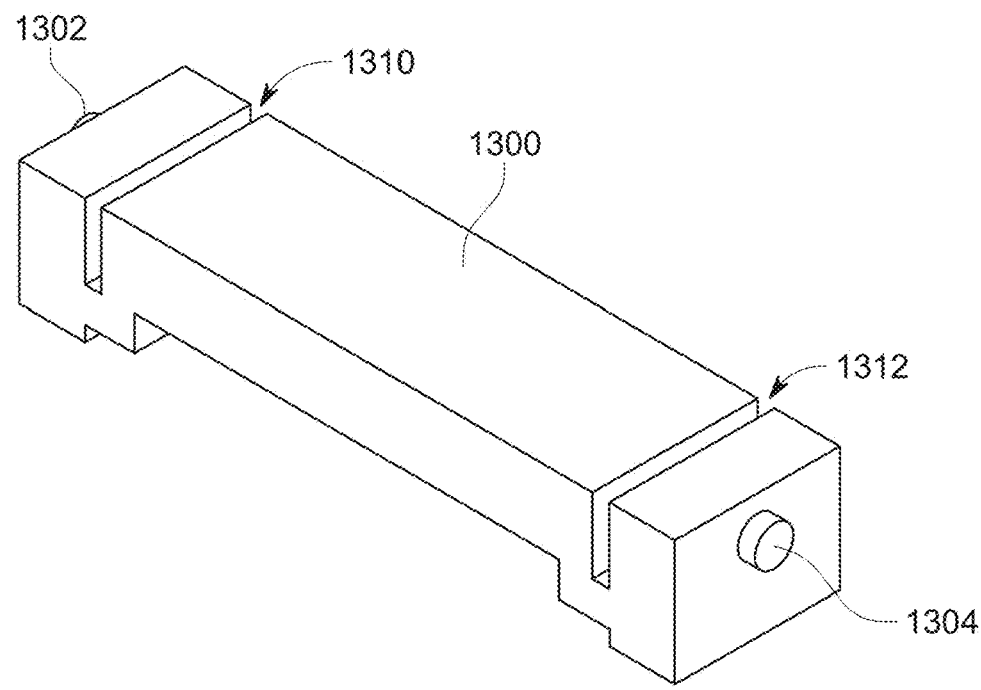
FIGS. 13A-C are schematic views of designs for thermal compensators with adjustable tensioners with a top-facing slot (FIG. 13A) bottom-facing slot (13-B), and tensioner design incorporated into a complex thermal compensator.
Figure 13B:
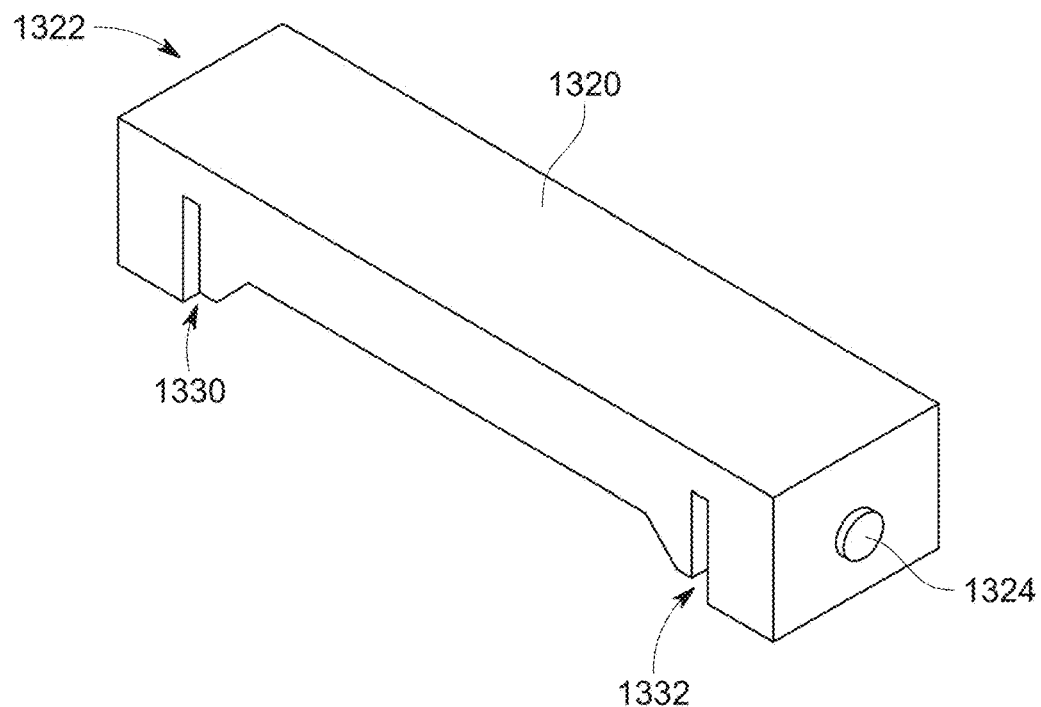
Figure 13C:
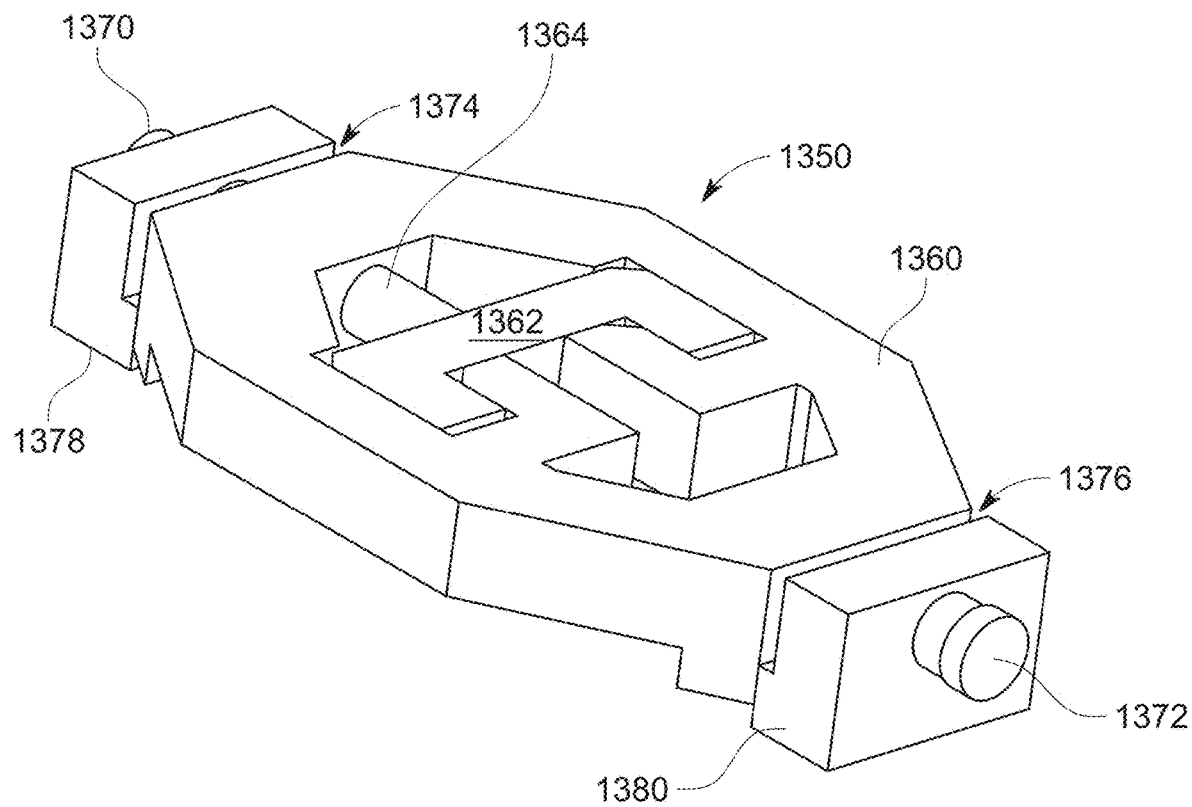

FIGS. 13A-C are schematic views of designs for thermal compensators with adjustable tensioners with a top-facing slot (FIG. 13A) bottom-facing slot (13-B), and tensioner design incorporated into a complex thermal compensator. FIG. 13A illustrates one example design for a pretensioner including slots 1310, 1312 near the ends that may be incorporated into a thermal compensator 1300. The slots 1310, 1312 are shown with the opening toward the top, while the slots 1330, 1332 on FIG. 13B are shown opening toward the bottom. FIG. 13C illustrates the complex thermal compensator 1350 (e.g., any one of the thermal compensators previously discussed) including a frame member 1360 and central bar member 1362, with the central bar member 1362 coupled to a screw 1364. The screw 1364 braces the central bar member 1362 against the mating surfaces of the frame member 1360. Screws 1370, 1372, attach on opposite ends of the thermal compensator 1350 at the legs 1378, 1380 of the thermal compensator 1350. While the embodiments are shown with the slots 1378, 1380 showing provide a recessed area for the tensioner, one skilled in the art will appreciate that other designs may be used without the need for a slot mechanism where other stressed or tensioned means may be possible.

Obviously, many variations and modifications of the present invention are possible in light of the above teachings. It is therefore to be understood that within the scope of the appended claims, the present invention may be practiced otherwise than as specifically described herein.

What is claimed is:

1. A thermal compensator for use in conjunction with an athermal arrayed waveguide grating (AAWG) module utilized for achieving wavelength multiplexing and de-multiplexing within optical networks, comprising:
a frame member having a hollow interior, the frame member being adapted to be connected to an athermal arrayed waveguide grating (AAWG) module;
a central bar member disposed within the hollow interior of the frame member, the central bar member having a substantially T-shaped configuration with transversely extending arms located at a head portion of the substantially T-shaped central bar member, wherein the transversely extending arms of the central bar member are attached at opposing sections of the frame member for increasing thermal expansion of the frame member in a direction perpendicular to an axis defining the opposing sections;
wherein the frame member is fabricated from a first predetermined material which has a first coefficient of thermal expansion (CTE), and the central bar member is fabricated from a second predetermined material which has a second CTE which is less than the first CTE of the first predetermined material comprising the frame member.

2. The thermal compensator of claim 1, wherein i) the central bar member length is shorter than the opposing sections of the frame member, and the outside surfaces of the extending arms are bonded to the inside surfaces of the frame member; ii) the central bar member is attached to the frame member by a half-lap or cross-lap bond; iii) the frame member comprises two sections joined by the central bar member; or iv) the central bar member comprises slots or holes on ends for mating to the frame member.

3. The thermal compensator of claim 1, wherein under relatively high temperature conditions, the frame member will expand at a greater rate than will the central bar member, whereas under relatively low temperature conditions, contraction of the central bar member will contract at a rate slower than the contraction of the central frame member effectively retarding the contraction of the frame member.

4. The thermal compensator of claim 3, wherein under the relatively high temperature conditions the central bar member is configured to retard expansion of the frame member in the transverse direction based on attachment and resisting expansion at the opposing sections of the frame member, and wherein under the relatively low temperature conditions the central bar member is configured to retard contraction of the frame member in the transverse direction based on attachment and resisting contraction at the opposing sections of the frame member.

5. The thermal compensator of claim 4, wherein:
under the relatively high or relatively low temperature conditions,
the frame member will expand and contract such that the incoming light path, of light coming into the athermal arrayed waveguide grating (AAWG) module, will experience an angular shift which is less than a predetermined range or error relative to the incoming light path under average temperature conditions.

6. The thermal compensator of claim 1, further comprising a screw having a first end portion thereof threadedly engaged within an end section of the frame member and a second end portion engaged with a foot portion of the central bar member such that the foot portion of the central bar member will be disposed in engagement with the screw when the thermal compensator has fully contracted under cold temperature conditions.

7. The thermal compensator of claim 6, wherein:
the screw is fabricated from a predetermined material having a Young's Modulus greater than the Young's Modulus of the central bar member; and
a protection block, fabricated from a predetermined material having a Young's Modulus which is substantially the same as the Young's Modulus of the screw, is fixedly secured to the end portion of the central bar member such that the screw cannot damage the central bar member when the end portion of the central bar member is engage with the second end portion of the screw.

8. An athermal arrayed waveguide grating (AAWG) module utilized for achieving wavelength multiplexing and de-multiplexing with optical networks, comprising:
a photonic chip having a fixed component and a movable component; and
a thermal compensator, comprising:
a frame member having a fixed end section connected to the fixed component of the photonic chip and a movable end section adapted to be-connected to the movable component of the photonic chip so as to move or displace the movable component of the photonic chip the frame member expands and contracts under hot and cold temperature conditions, and a central bar member disposed within a hollow interior of the frame member, the central bar member having a substantially T-shaped configuration with transversely extending arms located at a head portion of the substantially T-shaped central bar member, wherein the transversely extending arms of the central bar member are attached at opposing sections of the frame member, wherein the frame member is fabricated from a first predetermined material which has a first coefficient of thermal expansion (CTE), and the central bar member is fabricated from a second predetermined material which has a second coefficient of thermal expansion (CTE) which is less than the first coefficient of thermal expansion (CTE) of the first predetermined material comprising the frame member, whereby under hot temperature conditions, the frame member will expand at a greater rate than will the central bar member, whereas under cold temperature conditions, contraction of the central bar member at a rate slower than the contraction of the frame member will effectively retard the contraction of the frame member such that the athermal arrayed waveguide grating (AAWG) module can maintain the proper focus of light coming into the athermal arrayed waveguide grating (AAWG) module in order to achieve proper wavelength multiplexing and de-multiplexing within the optical networks.

9. The athermal arrayed waveguide grating (AAWG) module of claim 8, wherein the movable component of the photonic chip comprises a fractional portion of the athermal arrayed waveguide grating (AAWG) module.

10. The athermal arrayed waveguide grating (AAWG) module of claim 8, wherein:
the athermal arrayed waveguide grating (AAWG) module is effectively divided into a half section such that the movable component of the photonic chip comprises a first half of the athermal arrayed waveguide grating (AAWG) module while the fixed component of the photonic chip comprises a second half of the athermal arrayed waveguide grating (AAWG) module.

11. The athermal arrayed waveguide grating (AAWG) module of claim 9, wherein i) the central bar member length is shorter than the opposing sections of the frame member, and the outside surfaces of the extending arms are bonded to the inside surfaces of the frame member; ii) the central bar member is attached to the frame member by a half-lap or cross-lap bond; iii) the frame member comprises two sections joined by the central bar member; or iv) the central bar member comprises slots or holes on ends of the extending arms for mating to the frame member.

12. The athermal arrayed waveguide grating (AAWG) module of claim 9, further comprising a screw having a first end portion thereof threadedly engaged within an end section of the frame member and a second end portion engaged with a foot portion of the central bar member such that the foot portion of the central bar member will be disposed in engagement with the screw when the thermal compensator has fully contracted under cold temperature conditions.

13. A method for assembling an athermal arrayed waveguide grating (AAWG) module comprising a thermal compensator, the method comprising:

fabricating a frame member having a hollow interior being adapted to be connected to an athermal arrayed waveguide grating (AAWG) module, the frame member being fabricated from a first predetermined material which has a first coefficient of thermal expansion (CTE);

fabricating central bar member from a second predetermined material which has a second CTE which is less than the first CTE of the first predetermined material comprising the frame member, the central bar member having a substantially T-shaped configuration with transversely extending arms located at a head portion of the substantially T-shaped central bar member;

placing the central bar member within the hollow interior of the frame member; and attaching the transversely extending arms of the central bar member at opposing sections of the frame member for increasing thermal expansion of the frame member in a direction perpendicular to an axis defining the opposing sections.

14. The method of claim 13, wherein attaching the central bar member comprises gluing, soldering, using an epoxy, or welding the central bar member to the frame member.

15. The method of claim 13, further comprising tuning the AAWG module by adjusting a screw located on ends of the AAWG module.

16. The method of claim 13, further comprising attaching the frame member to the AAWG module using leg attachment points from the frame member.

* * * * *